Figure 1:
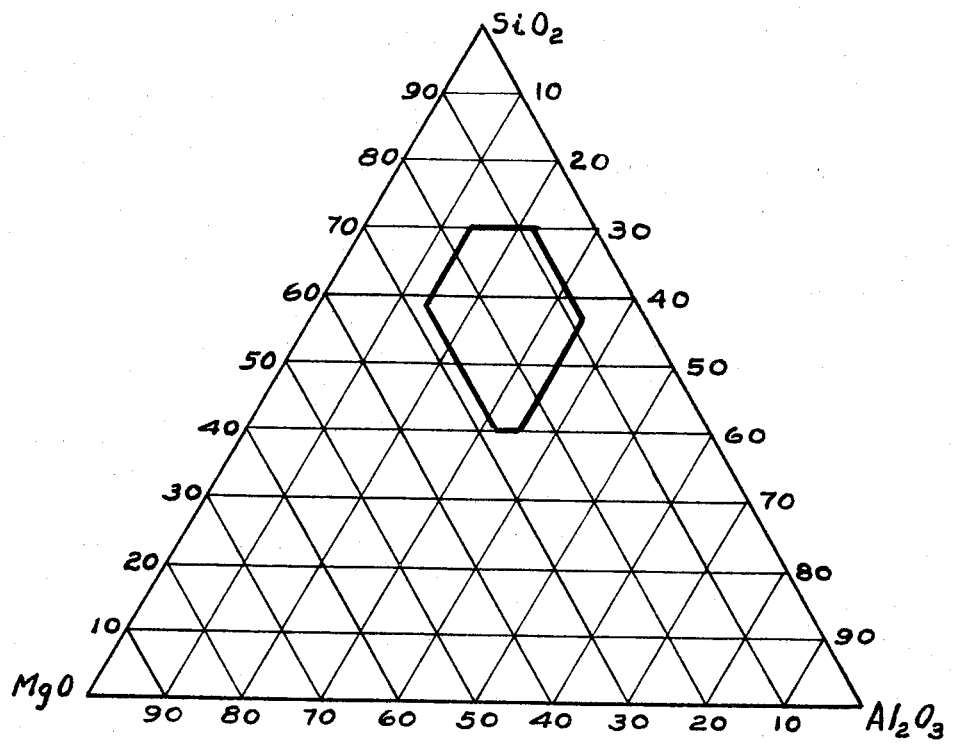

Aug. 23, 1966

S. D. STOOKEY 3,268,315

METHOD OF FORMING A DEVITRIFIED GLASS SEAL
WITH TUNGSTEN OR MOLYBDENUM

Filed March 26, 1962

2 Sheets-Sheet 2

INVENTOR.
STANLEY D. STOOKEY
BY
Clarence R. Patty Jr.
ATTORNEY

United States Patent Office

3,268,315
Patented August 23, 1966

3,268,315
METHOD OF FORMING A DEVITRIFIED GLASS SEAL WITH TUNGSTEN OR MOLYBDENUM
Stanley D. Stookey, Corning, N.Y., assignor to Corning Glass Works, Corning, N.Y., a corporation of New York
Filed Mar. 26, 1962, Ser. No. 182,590
1 Claim. (Cl. 65—33)

This invention relates to the manufacture of glass-ceramic bodies composed essentially of MgO, $Al_2O_3$, and $SiO_2$.

The manufacture of glass-ceramics or semicrystalline ceramic bodies, as they are often called, is a relatively recent development in the glass industry and contemplates the controlled crystallization of a glass in situ. This controlled crystallization is generally accomplished by introducing a nucleating or crystallization-promoting agent into a glass-forming batch, melting the batch, simultaneously shaping and cooling it into a glass body, and thereafter heat treating the shaped body following a critical time-temperature schedule. This heat treatment converts the glass into a body composed of fine-grained crystals dispersed substantially uniformly throughout a glassy matrix and comprising a major proportion of the mass of the body. The resulting glass-ceramic normally exhibits physical properties differing substantially from those of the base glass. Because it is originally a glass, the body can be shaped into almost any configuration using the conventional methods of shaping glass, e.g., pressing, spinning, blowing, drawing, or casting. Furthermore, as the crystallization of the glass occurs in situ, a substantially homogenous body of fine crystals can be produced which is substantially free of voids and non-porous.

Titania ($TiO_2$) has had the widest commercial use as a nucleator or crystallization-promoting agent for glass-ceramic bodies consisting principally of MgO, $Al_2O_3$, and $SiO_2$.

However, $TiO_2$ nucleated glass-ceramics have proved sensitive to heating in a reducing atmosphere. This is particularly critical in the field of electrical components where a glass-ceramic is desirably sealed to a metal. Often, as in the case with tungsten, a reducing atmosphere must be used to protect the metal. Experience has shown that the electrical insulating properties and strength of $TiO_2$ nucleated glass-ceramics deteriorate substantially under such conditions.

It is, therefore, the primary object of my invention to provide a glass-ceramic body exhibiting high strength and outstanding electrical insulating properties during and after being subjected to heat under reducing conditions.

It is another object of my invention to provide a method of making a glass-ceramic body capable of retaining high strength and excellent electrical insulating properties when heated under reducing conditions which is relatively simple and economical in operation, and which can be practiced using apparatus and techniques well known to the glass industry.

I have discovered, and it is upon this discovery that my invention is based, that chromium oxide, expressed as $Cr_2O_3$, is a very effective nucleating or crystallization-promoting agent for glass bodies composed essentially of MgO, $Al_2O_3$, and $SiO_2$. That is to say, I have discovered that by the addition of a minor amount (0.4–2.5% by weight) of chromium oxide to a glass-forming batch of MgO, $Al_2O_3$, and $SiO_2$ which is then melted, cooled and shaped, and thereafter given a specific heat treatment, a semicrystalline body generally comprising spinel and/or magnesium meta-silicate as the principal crystalline phases can be formed. Laboratory and field tests have shown these bodies to be relatively unaffected by reducing atmospheres.

My invention comprises melting a glass-forming batch consisting essentially of 40–70 weight percent of $SiO_2$, 8–27 weight percent of MgO, 14–34 weight percent of $Al_2O_3$, and 0.4–2.5 weight percent of $Cr_2O_3$, simultaneously cooling and shaping the melt into a glass body of a desired configuration, the cooling being rapid and continued to at least below the transformation point, i.e., the temperature at which the liquid melt is considered to have been transformed into an amorphous solid, generally in the vicinity of the annealing point of the glass, thereafter raising the temperature to at least about 800° C., but not higher than about 1350° C., maintaining this temperature until the desired crystallization is attained, after which the semicrystalline body is cooled to room temperature. My preferred heat treatment consists of a two-step heating schedule wherein the glass body is heated to about 850°–950° C. and held there for ¼–4 hours in order to initiate nucleation following which the temperature of the body is raised to 1000°–1250° C. for 2–8 hours in order to attain the desired crystallization.

Various modifications in procedure from my preferred embodiment are possible. When the melt is quenched and shaped into a glass body, the body may be cooled to room temperature for inspection before beginning the heat treating cycle. However, where economies in fuel costs are desired, the body may be quenched to the transformation point only and the heat treating schedule begun immediately.

Although a two-step heating schedule is preferred, I have learned that an eminently satisfactory product can be produced when the glass body is heated at a constant rate from room temperature or the deformation range to temperatures within the 800°–1350° C. range. The body may be held at a particular temperature for a period of time to assure the desired crystallization is attained. However, if the rate of heating is relatively slow and the final temperature near the upper limit of the stipulated range, no period of holding will be required.

The rate of heating of glass bodies which can be tolerated is usually founded on two factors: the ability of the glass body to resist thermal shock and the speed of crystallization within the body. The comparatively low thermal expansion coefficients of the $MgO \cdot Al_2O_3 \cdot SiO_2$ glasses of this invention give them such resistance to thermal shock that this factor is not of much importance herein when compared with the second factor. As was explained previously, the glass body is heated above the transformation point to initiate crystallization after which the body is generally raised to a still higher temperature to expedite and increase crystallization. When the glass body is heated above the transformation point, softening of the body occurs and deformation takes place. The softening point and, therefore, the deformation temperature of the semicrystalline body is considerably higher than the base glass. Hence, the rate of heating the glass body must be balanced against the speed at which crystals are formed within the body. Too rapid heating will not permit the formation of sufficient crystals to support the body, and slumping will occur. I have found that crystallization occurs more rapidly as the temperature of the body approaches the liquidus of the crystal phase. Therefore, it is more practical commercially to treat the bodies at higher temperatures. Although heating rates of 10° C./min. and higher have been used successfully, I prefer a range of about 3°–5° C./min. This range has produced bodies with very little, if any, deformation throughout the whole field of compositions contemplated by this invention. Nevertheless, the guidepost to the heating rate is the balance with the speed of crystallization. Obviously, in those compositions where crystallization is relatively rapid at temperatures close to the transformation point, a faster heating schedule can be used. Of course, an even slower heating rate than 3° C./min. will yield a good semi-crystalline body. It will be appreciated that this modification in method allows a continuous-type operation to be followed.

Another modification in the method of my invention contemplates merely heating the glass body to some temperature just above the transformation point and holding thereat for a period sufficient to attain the desired crystallization. Obviously, where the temperature employed is but slightly higher than the annealing point (about 700°–800° C. for the compositions involved herein), a very long holding time, say 24 hours or even longer, will be required.

It will be understood that in each of these variations in method the rate of heating is based upon the rate of crystallization, as was explained more fully above in the "continuous-type operation."

I have found the limits of the composition ranges set out above to be critical to the invention. Where the amount of $SiO_2$ present is greater than about 70 weight percent, the melt becomes too viscous to be useable at normal melting temperatures and for conventional forming practices. Where less than about 8 weight percent MgO is utilized, a beta-quartz-type phase occurs, the alpha-beta inversion of which during cooling causes disruption of the body. More than about 27 weight percent of MgO leads to the formation of crystal phases which are incompatible with the principal phases (spinel and magnesium metasilicate) found in the semicrystalline bodies. Where more than about 34 weight percent of $Al_2O_3$ is present, a stable glass is difficult to secure, i.e., crystallization occurs during the quenching step. At least about 14 weight percent of $Al_2O_3$ should be present giving strength and durability to the body and to cause the formation of the desired crystallization. The narrow range of chromium oxide content useable in my invention is principally due to the extremely limited solubility of this oxide in the glass melt. Above about 2.5 weight percent there is such an excess of unmelted $Cr_2O_3$ grains that the body becomes quite weak. Further, such an amount will often cause crystallization to occur during the quenching step. As a matter of fact, the presence of more than about 1.0 weight percent of $Cr_2O_3$ causes the production of a faint opal glass rather than a clear body. Although a satisfactory body can be made from this opal glass, the presence of this small amount of unmelted $Cr_2O_3$ causes a loss of strength and I prefer to use about 0.4–0.8% $Cr_2O_3$.

Other compatible metal oxides may also be present provided their total amount does not exceed about 5 weight percent of the batch. Such compatible metal oxides include $K_2O$, $B_2O_3$, $TiO_2$, BaO, ZnO, and PbO. $K_2O$, $B_2O_3$, PbO, and $TiO_2$ act as fluxes which aid in melting the batch. $TiO_2$ and $B_2O_3$ promote crystallization as well as function as fluxes. The BaO and ZnO are particularly valuable in improving the resistance of the body to disintegration under reducing conditions. The presence of any of these materials must be kept low to avoid the formation of incompatible crystal phases. Other fluxes may be substituted for those mentioned but these, like $K_2O$, $B_2O_3$, PbO, and $TiO_2$, may have a deleterious effect on the electrical properties and strength of the product.

Although the melts herein are generally of low viscosity, a fining agent such as $As_2O_3$ may be included in the batch. Generally, no more than about 0.5–1.0 weight percent is added and, as the amount remaining in the glass after the batch is melted is so small the fundamental properties of the glass are unaffected, this component is not included in the succeeding table of compositions.

In the following examples, the batches were compounded, ball milled for periods ranging from 6–24 hours to aid in obtaining a homogeneous melt, and then melted at temperatures ranging from about 16 hours at 1550° C. to about 7 hours at 1720° C. The batches containing higher alumina contents are advantageously melted at the higher temperatures. The batches were melted in crucibles, pots, or tanks depending upon the quantity of product desired. The melts were then poured into steel molds and cooled as a glass to room temperature. The glass shapes were placed in a furnace and heated at the rates indicated in Table I to the temperature of the first level of heat treatment and held thereat for a sufficient time to initiate nucleation, as also recorded in Table I. The furnace temperature was then raised at the same rate to the second level of heat treatment, as set out in Table I, and thereafter the semicrystalline bodies were allowed to cool to room temperature. The speed of cooling to room temperature is governed by the resistance to thermal shock possessed by the body. The moderate thermal expansion of the product permits rapid temperature changes and some shapes have been removed from the furnace immediately after the second step of the heat treating has been completed and cooled in air to room temperature. Nevertheless, caution has suggested a lower cooling rate and often the supply of heat to the furnace is merely cut off and the furnace allowed to cool with the semicrystalline shapes retained therein.

Table I illustrates examples having compositions falling within the aforementioned ranges calculated from their respective batches to the oxide basis in weight percent, exclusive of impurities which may be present in the batch materials. The batch materials may comprise any materials, either oxides or other compounds, which, on being fused together, are converted to the desired oxide compositions in the desired proportions.

Table I also records the moduli of rupture (p.s.i.), densities, coefficients of thermal expansion at 0–300° C. ($\times 10^7$) of the glass-ceramic bodies as well as the crystal phases present, as determined by X-ray diffraction analysis. Although physical properties and crystal structure were not obtained in every composition studied, each of the following examples represents a batch which was actually melted and heat treated to yield a satisfactory product.

*Table I*

|  | 1 | 2 | 3 | 4 |
|---|---|---|---|---|
| $SiO_2$ | 59.0 | 61.0 | 59.0 | 67.3. |
| $Al_2O_3$ | 16.0 | 16.0 | 15.9 | 22.7. |
| MgO | 23.0 | 21.0 | 21.7 | 8.9. |
| $Cr_2O_3$ | 0.6 | 0.6 | 1.0 | 0.7. |
| BaO | 1.4 | 1.4 | 2.4 | |
| Rate of heating | 5° C./min | 5° C./min | 5° C./min | 7° C./min. |
| Hours | 2 | 4 | 4 | 0.5. |
| ° C. | 950 | 850 | 800 | 815. |
| Hours | 4 | 4 | 4 | 12. |
| ° C. | 1,250 | 1,050 | 1,050 | 1,020. |
| Mod. of rupture | 13,700 | | 14,350 | 45,000. |
| Density | | 2.8978 | 2.9319 | |
| Expansion | 53.1 | 72.7 | 70.0 | |
| Crystals formed | Magnesium metasilicate. | Magnesium metasilicate. | Magnesium metasilicate. | Spinel. |

Table I.—Continued

| | 5 | 6 | 7 | 8 | 9 | 10 |
|---|---|---|---|---|---|---|
| $SiO_2$ | 50.7 | 49.7 | 67.9 | 63.9 | 50.1 | 60.0 |
| $Al_2O_3$ | 33.5 | 33.1 | 19.0 | 14.6 | 17.7 | 16.2 |
| MgO | 14.3 | 14.6 | 10.0 | 17.2 | 26.9 | 22.1 |
| $Cr_2O_3$ | 1.5 | 2.5 | 0.6 | 0.8 | 0.4 | 0.5 |
| BaO | | | 1.4 | | | 1.2 |
| $K_2O$ | | | 1.0 | | | |
| PbO | | | | 3.6 | | |
| $TiO_2$ | | | | | 5.0 | |
| Rate of heating | 3° C./min | 5° C./min | 5° C./min | 5° C./min | 5° C./min | 5° C./min |
| Hours | 0.5 | 0.25 | 4 | 2 | 4 | 4 |
| ° C. | 900 | 950 | 850 | 960 | 890 | 850 |
| Hours | 3 | 4 | 4 | 8 | 4 | 8 |
| ° C. | 1,250 | 1,350 | 1,250 | 1,050 | 1,150 | 960 |
| Mod. of rupture | 35,000 | 31,000 | 22,000 | 17,000 | 9,050 | 14,000 |
| Density | | 2.696 | | | | 2.876 |
| Expansion | 45.0 | 38.4 | 59.6 | | | |
| Crystals formed | Spinel | Spinel | Magnesium metasilicate | Magnesium metasilicate | Magnesium metasilicate | Magnesium metasilicate Spinel |

Table I amply demonstrates the effectiveness of chromium oxide as a nucleator or crystallization-promoter in magnesia-alumina-silica glasses. The crystal content of the bodies has been determined to be at least 30 weight percent, but is generally on the order of 50 weight percent, and preferably even higher. This characteristic is dependent upon the extent to which the components of the batch are adaptable to the formation of crystal phases. The crystals, themselves, are very fine grained, i.e., substantially all finer than about 30 microns in diameter, and are randomly dispersed throughout the glassy matrix.

My invention, then, provides a method for manufacturing semi-crystalline ceramic bodies of the $$MgO—Al_2O_3—SiO_2$$

system which are dense, strong, and resistant to thermal shock, and which are capable of retaining these properties when heated under reducing conditions. Still another advantage which these chromium oxide-nucleated bodies possess, when compared with those derived using $TiO_2$ as the crystallization-promoting agent, in their application of providing seals to metal elements involves their coefficients of thermal expansion. The principal crystal phase produced in the $TiO_2$-nucleated ternary system $MgO—Al_2O_3—SiO_2$ is generally cordierite, while X-ray diffraction analyses have shown the principal phases present in the chromium oxide-nucleated system to be magnesium metasilicate and/or spinel. The coefficients of thermal expansion of these crystals are higher than cordierite and yield bodies whose coefficients closely match those of tungsten and molybdenum, two metals frequently used in electrical components. The composition of Example 7 has given excellent results in brazing and metallizing with molybdenum.

Although in each of the above examples the glass bodies were shaped by pouring the melt into steel molds, it will be understood that any of the conventional glass forming methods such as blowing, pressing, rolling, or spinning is also applicable.

FIG. 1 illustrates the ranges of the compositions of MgO, $Al_2O_3$ and $SiO_2$ encompassed in my invention.

Figure 2:
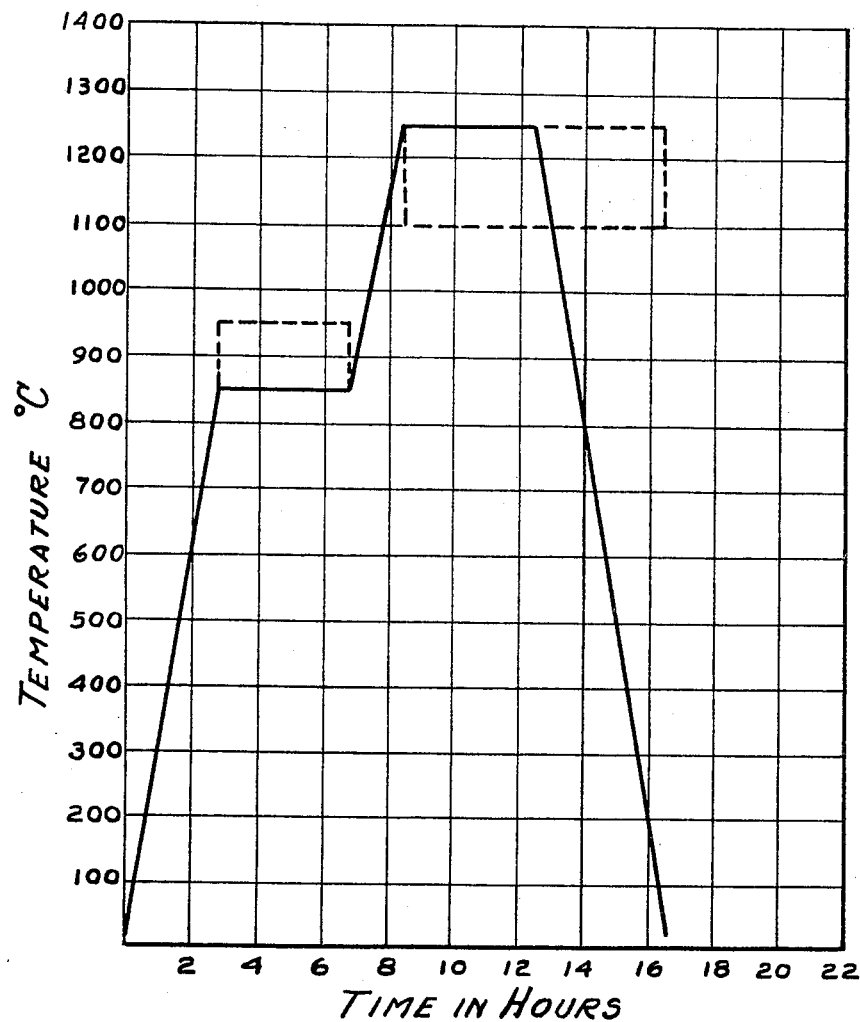

FIG. 2 depicts a time-temperature curve for the heat treatment of a specific example of my invention, viz., Example 7 recorded in Table I wherein after the batch had been melted, as, for example, by heating in a crucible at a temperature of about 1550° C. for about 16 hours, shaped, and cooled to room temperature, the glass body was given the following heat treatment: the temperature was raised at 5° C./minute to 850° C., maintained thereat for 4 hours, thereafter the temperature was raised at 5° C./minute to 1250° C., maintained thereat for 4 hours, and cooled at 5° C./minute to room temperature. The area enclosed within the dotted lines represents the ranges of my preferred two-step process.

What is claimed is:

In the method of forming a seal between a metal selected from the group consisting of tungsten and molybdenum and a semicrystalline ceramic body having coefficient of thermal expansion compatible with that of tungsten and molybdenum metals, the improvement which consists of contacting said metal with a glass consisting essentially, by weight on the oxide basis, of 40–70% $SiO_2$, 8–27% MgO, 14–34% $Al_2O_3$, and 0.4–2.5% $Cr_2O_3$, the total of said $SiO_2$ MgO, $Al_2O_3$, and $Cr_2O_3$ constituting at least about 95% by weight of said glass, fusing said glass to said metal, and then causing said glass to crystallize in situ by heating to a temperature between about 800°–1350° C. for a time sufficient to obtain crystallization consisting essentially of at least one crystal phase selected from the group consisting of magnesium metasilicate and spinel.

References Cited by the Examiner

UNITED STATES PATENTS 3,063,198  11/1963  Babcock _____ 65—33 X
3,117,881  1/1964  Henry et al. _____ 65—33

FOREIGN PATENTS 1,099,135  2/1961  Germany.

S. LEON BASHORE, Primary Examiner.

DONALL H. SYLVESTER, Examiner.

G. R. MYERS, Assistant Examiner.